Aug. 10, 1937.   E. MAY   2,089,703
MOTION PICTURE PROJECTING APPARATUS
Filed June 27, 1935
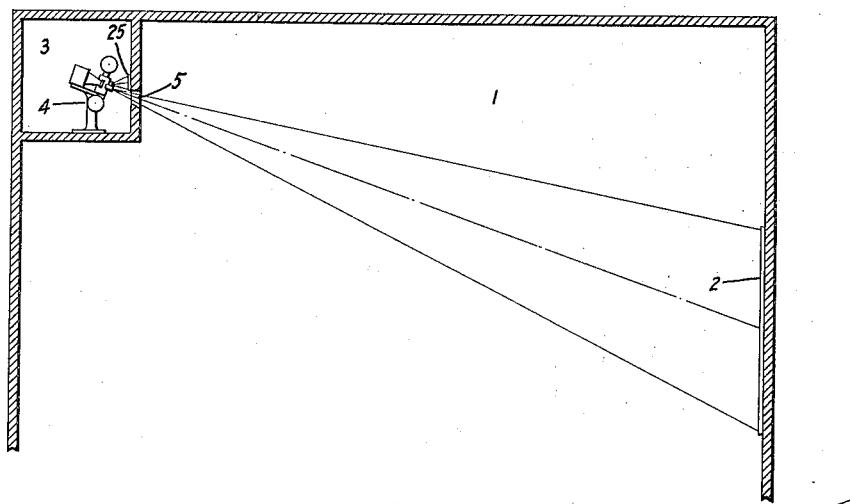
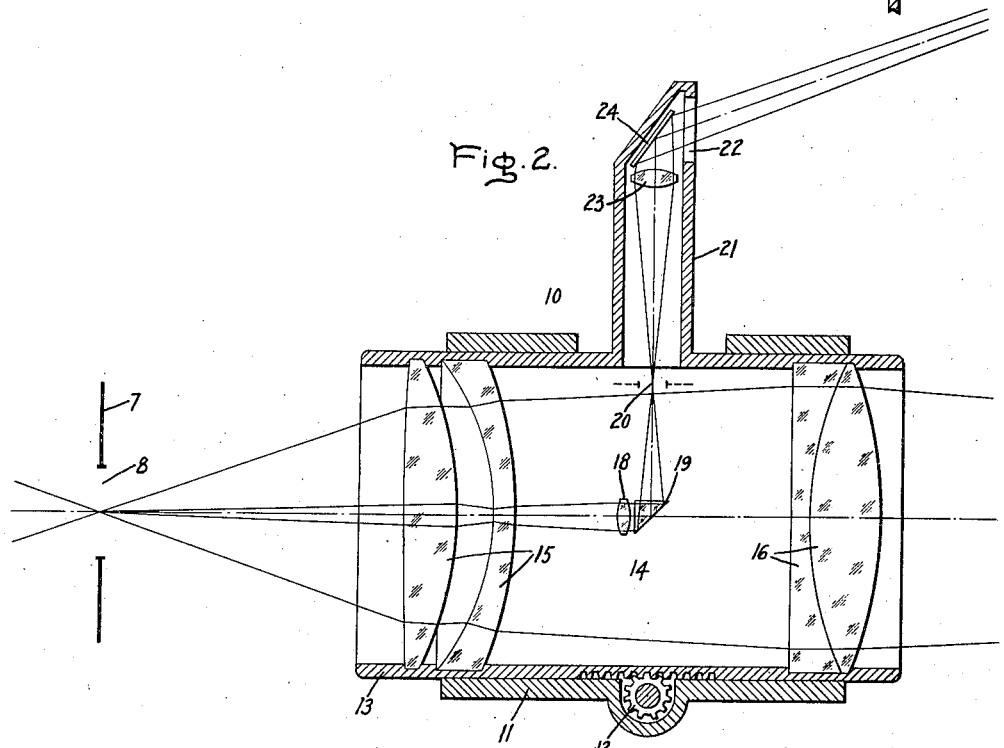
Inventor:
Erwin May,
by Harry E. Dunham
His Attorney.

Patented Aug. 10, 1937

2,089,703

UNITED STATES PATENT OFFICE 2,089,703

MOTION PICTURE PROJECTING APPARATUS

Erwin May, Berlin-Oberschoneweide, Germany, assignor to General Electric Company, a corporation of New York Application June 27, 1935, Serial No. 28,718
In Germany July 5, 1934

1 Claim. (Cl. 88—24)

My invention relates to motion picture projecting apparatus and particularly to that type of such apparatus which is employed in motion picture theaters and which usually is housed in a projection booth at the rear of the theater. It is well known that in such installations the projector operator must keep constant watch of the pictures being thrown upon the screen in order immediately to make whatever changes in the focus and in the framing of the pictures may be required from time to time to insure the proper showing thereof. The projection booth or room is provided with a window through which the operator may observe the pictures being thrown upon the screen, but because of the fire hazard the window usually is very small and this makes it necessary for the operator to remain close to the window whenever pictures are being projected. Moreover, because of the great distance between the booth and the screen in many theaters it is difficult for the operator to see clearly whether or not the pictures are in the best focus. In such cases a small telescope sometimes is used, the use of which also requires that the operator should remain close to the window.

It is the object of my invention to provide an improved construction of projecting apparatus which will overcome the difficulties pointed out above and which will enable the operator to keep as close watch as need be on the projected picture and still permit him to be about his various duties in the booth.

My invention will be better understood from the following description taken in connection with the accompanying drawing, and its scope will be pointed out in the appended claim.

Referring to the drawing, Fig. 1 shows a portion of a motion picture theater including the projection booth with the projector therein and the screen upon which the pictures are thrown; Fig. 2 is a detail of a portion of the projector shown in Fig. 1.

In Fig. 1 of the drawing I have represented at 1 a motion picture theater having at the front thereof the usual screen 2 upon which the motion pictures are projected and having at the rear thereof and near the ceiling the projection booth 3 containing the picture projector 4. The booth is shown provided with the usual window 5 through which the pictures are projected.

The projector 4 may be of any suitable and well known form being provided with the part 7, see Fig. 2, in which is formed the window 8 past which the film, not shown, bearing the pictures is passed. The projector also includes the objective 10 by means of which the light rays from the window 8 are focused on the screen 2 of the theater. The objective 10 in the present case is similar in general to objectives in common use in motion picture apparatus since it includes the fixed tubular portion 11 containing the focusing pinion 12 and the movable tubular member 13 therein having a rack engaged by the pinion 12 and supporting the lens system 14. This system is represented as comprising the two pairs of lenses 15 and 16 arranged in spaced relation to each other.

In accordance with my invention I have provided the small convex lens 18 and the reflecting prism 19 within the objective and between the two pairs of lenses. This lens and prism are suitably supported by means not shown in the drawing, and in the vicinity of the main plane of the objective. Those light rays which are refracted by lens 18 and reflected laterally by the prism 19, are shown brought to a focus at the point 20 just before reaching the member 13, and at that point produce an image of the window member 7 and of whatever picture may be in front of the window therein. Opposite the focal point 20 the member 13 is provided with a lateral extension 21 which is closed at the outer end and which contains the side opening 22. Within the extension 21 is the convex lens 23 and the mirror 24 whereby the light rays from the focal point 20 are deflected and focused on a suitable surface near the projector so as to form a reduced image similar to the image formed on the distant screen 2. The surface upon which this reduced image is formed may, for example, comprise a small screen such as that shown at 25 in Fig. 1, which screen is arranged within the projection booth and supported in any suitable manner at the proper distance from the projector. The lenses 18 and 23 and the position of the screen 25 are such that when the image on screen 25 is sharp the image on the distant screen 2 also is sharp. As a result of the construction which I have described the adjustment of the objective to vary the focus of the picture thrown on the distant screen 2 correspondingly varies the focus of the reduced picture thrown on the screen 25 in the booth. Inasmuch as the focal length of the lens 23 is less than the focal length of the main lens system 14, the sensitivity of adjustment of lens 23 is greater than that of the main lens system whereby the operator by observing the reduced picture is better able to produce a sharp focus of the picture on the distant screen.

I have chosen the particular embodiment described above as illustrative of my invention and it will be apparent that various modifications may be made without departing from the spirit and scope of my invention, which modifications I aim to cover by the appended claim.

What I claim as new and desire to secure by Letters Patent of the United States is:

Projecting apparatus comprising an objective for focusing a light beam to form pictures on a distant screen, said objective having lenses mounted therein in spaced relation and having a lateral extension, a reflector mounted in said objective in the space between said lenses for reflecting laterally all the rays of a small part of said beam, a second reflector mounted in said extension for reflecting said laterally reflected rays and means for focusing said reflected rays on an adjacent surface.

ERWIN MAY.